United States Patent [19]

Kuroda

[11] Patent Number: 5,119,197
[45] Date of Patent: Jun. 2, 1992

[54] CYCLIC NOISE-REDUCING APPARATUS

[75] Inventor: Kazuo Kuroda, Tokorozawa, Japan

[73] Assignee: Pioneer Electronic Corporation, Tokyo, Japan

[21] Appl. No.: 653,238

[22] Filed: Feb. 11, 1991

[30] Foreign Application Priority Data

Mar. 22, 1990 [JP] Japan .................. 2-73860

[51] Int. Cl.$^5$ ............................................ H04N 5/21
[52] U.S. Cl. ........................................ 358/167; 358/13
[58] Field of Search ............... 358/13, 36, 167, 31

[56] References Cited

U.S. PATENT DOCUMENTS

| | | | |
|---|---|---|---|
| 4,227,204 | 10/1980 | Rossi | 358/13 |
| 4,286,291 | 8/1981 | Taylor et al. | 358/13 |
| 4,725,887 | 2/1988 | Field | 358/167 |
| 4,730,217 | 3/1988 | Tonge et al. | 358/167 |
| 4,807,034 | 2/1989 | Takeuchi et al. | 358/36 |
| 4,858,026 | 8/1989 | Richards | 358/13 |
| 4,870,482 | 9/1989 | Yasuki et al. | 358/31 |
| 4,897,716 | 1/1990 | Drewery et al. | 358/167 |
| 4,953,009 | 8/1990 | Yamada et al. | 358/31 |
| 5,003,389 | 3/1991 | Isobe et al. | 358/31 |
| 5,018,010 | 5/1991 | Masumoto | 358/167 |

FOREIGN PATENT DOCUMENTS

| | | | |
|---|---|---|---|
| 0102180 | 8/1981 | Japan | 358/13 |
| 0212282 | 12/1983 | Japan | 358/13 |

Primary Examiner—James J. Groody
Assistant Examiner—Jeffrey S. Murrell
Attorney, Agent, or Firm—Foley & Lardner

[57] ABSTRACT

In a cyclic noise-reducing apparatus a reset signal is produced for each field based on an input video signal to make a start in the sub-sampling operation from the initial state, and data at the same positions are sub-sampled respectively in odd and even fields under the sub-sampling operation. Accordingly, false data having different lines are prevented from being circulated even when data including data prior to 1 field are subjected to the interpolation, so that a satisfactory noise-reducing effect can be obtained.

4 Claims, 8 Drawing Sheets

Fig. 1(a)
PRIOR ART

| $A_1$ | $A_2$ | $A_3$ | $A_4$ | $A_5$ |
|---|---|---|---|---|
| $B_1$ | $B_2$ | $B_3$ | $B_4$ | $B_5$ |
| $C_1$ | $C_2$ | $C_3$ | $C_4$ | $C_5$ |
| $D_1$ | $D_2$ | $D_3$ | $D_4$ | $D_5$ |

Fig. 1(b)
PRIOR ART

| $A'_1$ | $A'_2$ | $A'_3$ | $A'_4$ | $A'_5$ |
|---|---|---|---|---|
| $B'_1$ | $B'_2$ | $B'_3$ | $B'_4$ | $B'_5$ |
| $C'_1$ | $C'_2$ | $C'_3$ | $C'_4$ | $C'_5$ |
| $D'_1$ | $D'_2$ | $D'_3$ | $D'_4$ | $D'_5$ |

Fig. 2
PRIOR ART

| $A_1$ | $A_1$ | $A_3$ | $A_3$ | $A_5$ |
|---|---|---|---|---|
| $B_1$ | $B_1$ | $B_3$ | $B_3$ | $B_5$ |
| $B_{910}$ | $C_2$ | $C_2$ | $C_4$ | $C_4$ |
| $C_{910}$ | $D_2$ | $D_2$ | $D_4$ | $D_4$ |

Fig. 3
PRIOR ART

| $A'_1+A_1$ | $A'_2+a_2$ | $A'_3+A_3$ | $A'_4+a_4$ | $A'_5+A_5$ |
|---|---|---|---|---|
| $B'_1+B_1$ | $B'_2+b_2$ | $B'_3+B_3$ | $B'_4+b_4$ | $B'_5+B_5$ |
| $C'_1+A_1$ | $C'_2+C_2$ | $C'_3+A_3$ | $C'_4+C_4$ | $C'_5+A_5$ |
| $D'_1+B_1$ | $D'_2+D_2$ | $D'_3+B_3$ | $D'_4+D_4$ | $D'_5+B_5$ |

Fig. 8(a)
Fig. 8(b)
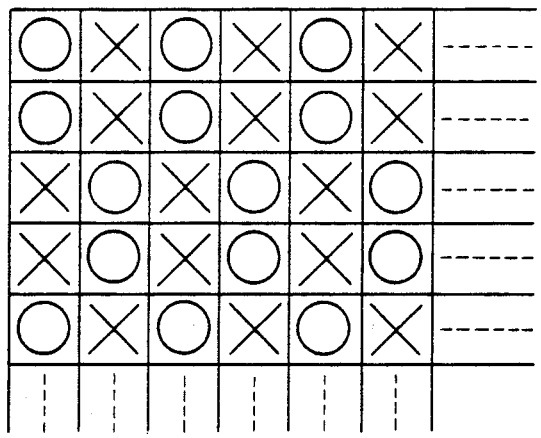
Fig. 10(a)
Fig. 10(b)
| $A_1$ | $A_2$ | $A_3$ | $A_4$ | $A_5$ |
|---|---|---|---|---|
| $B_1$ | $B_2$ | $B_3$ | $B_4$ | $B_5$ |
| $C_1$ | $C_2$ | $C_3$ | $C_4$ | $C_5$ |
| $D_1$ | $D_2$ | $D_3$ | $D_4$ | $D_5$ |
| $A'_1$ | $A'_2$ | $A'_3$ | $A'_4$ | $A'_5$ |
|---|---|---|---|---|
| $B'_1$ | $B'_2$ | $B'_3$ | $B'_4$ | $B'_5$ |
| $C'_1$ | $C'_2$ | $C'_3$ | $C'_4$ | $C'_5$ |
| $D'_1$ | $D'_2$ | $D'_3$ | $D'_4$ | $D'_5$ |
Fig. 11
| $A_1$ | $A_1$ | $A_3$ | $A_3$ | $A_5$ |
|---|---|---|---|---|
| $B_1$ | $B_1$ | $B_3$ | $B_3$ | $B_5$ |
| $B_{910}$ | $C_2$ | $C_2$ | $C_4$ | $C_4$ |
| $C_{910}$ | $D_2$ | $D_2$ | $D_4$ | $D_4$ |
Fig. 12
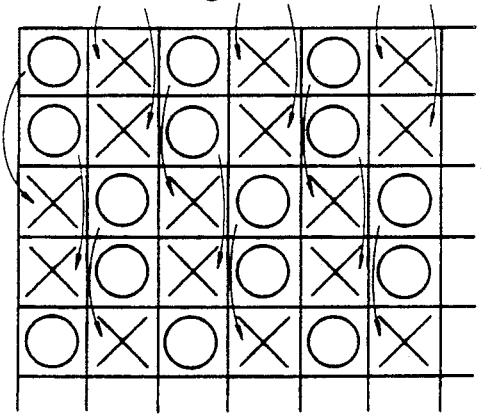

Fig. 13

| A₁ | a₂ | A₃ | a₄ | A₅ |
|----|----|----|----|----|
| B₁ | b₂ | B₃ | b₄ | B₅ |
| A₁ | C₂ | A₃ | C₄ | A₅ |
| B₁ | D₂ | B₃ | D₄ | B₅ |
|    |    |    |    |    |

Fig. 14

| A′₁+A₁ | A′₂+a₂ | A′₃+A₃ | A′₄+a₄ | A′₅+A₅ |
|--------|--------|--------|--------|--------|
| B′₁+B₁ | B′₂+b₂ | B′₃+B₃ | B′₄+b₄ | B′₅+B₅ |
| C′₁+A₁ | C′₂+C₂ | C′₃+A₃ | C′₄+C₄ | C′₅+A₅ |
| D′₁+B₁ | D′₂+D₂ | D′₃+B₃ | D′₄+D₄ | D′₅+B₅ |
|        |        |        |        |        |

Fig. 15

| A′₁+A₁ | A′₁+A₁ | A′₃+A₃ | A′₃+A₃ | A′₅+A₅ |
|--------|--------|--------|--------|--------|
| B′₁+B₁ | B′₁+B₁ | B′₃+B₃ | B′₃+B₃ | B′₅+B₅ |
| B′ₚᵣₑ+Bₚᵣₑ | C′₂+C₂ | C′₂+C₂ | C′₄+C₄ | C′₄+C₄ |
| C′ₚᵣₑ+Cₚᵣₑ | D′₂+D₂ | D′₂+D₂ | D′₄+D₄ | D′₄+D₄ |
|        |        |        |        |        |

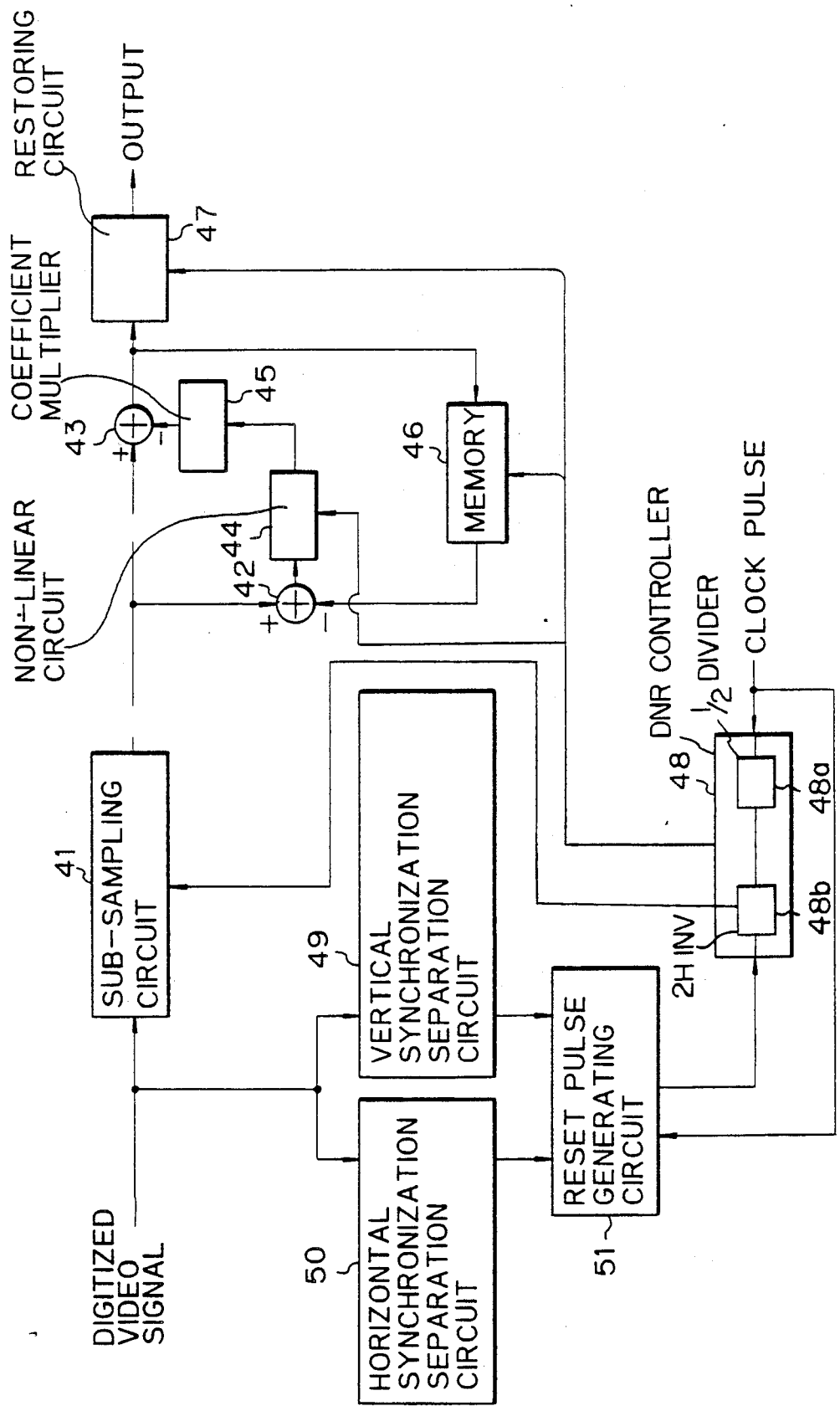

CYCLIC NOISE-REDUCING APPARATUS

BACKGROUND OF THE INVENTION

1. Field of the Invention

The present invention relates to a cyclic noise-reducing apparatus for reducing noise included in a video signal.

2. Description of the Related Art

It has heretofore been known a cyclic noise-reducing apparatus of a type wherein video signals are averaged for each frame period on a time basis by paying attention to the fact that the video signals have a strong autocorrelation between frames and the component of noise included in the video signals has generally little autocorrelation, whereby the energy of the noise component is only reduced without substantially changing the energy of the signal component.

In a conventional cyclic noise-reducing apparatus, mixing means for mixing together an A/D converted input video signal and a processing signal to be mixed in a mixture ratio corresponding to a coefficient k is provided therein. An output signal of the mixing means is delayed by a period corresponding to 1 field by means of a field memory or the like and the output thus delayed is applied to the mixing means as the mixed processing signal. A video signal issued from the mixing means becomes a output signal of the apparatus. Where it is desired to write data into the field memory, odd and even fields are treated as 263H and 262H (H represents one horizontal scanning period) respectively. In addition, it has also been practiced to sub-sample digital data with a frequency of ½ time that of a clock signal for A/D conversion in order to reduce the capacity of the memory. Thinned video signals are subjected to interpolation by means of a suitable means as a result of the sub-sampling. However, when the interpolated data are arranged in alignment to the vertical direction, they fall into a striped pattern. It is therefore preferable to invert sampling positions or points for each prescribed horizontal scanning line.

Further, when data interpolation is effected with the data in the vertical direction, the interpolation is made with chroma signals synchronized in phase with each other. Therefore, a clock signal for the sub-sampling is inverted for each 2nH (n=1, 2, 3, . . . ).

Now, the output signal to be issued from the noise-reducing apparatus can be represented as follows:

$$A - kf(A - B)$$

$f(A-B)$ shows an input/output characteristic of a non-linear circuit employed in the apparatus represented by a function.

The reference characters A (i.e., an input to the memory) and B (a signal delayed by 1 field in the memory) are both mixed together even for each data. Let's here assume that k is equal to 0.5 and the output of the non-linear circuit, i.e., $f(A-B)$ is equal to $A-B$ for the simplicity of illustration. At this case, the following equation is derived:

$$0.5A + 0.5B = 0.5(A + B)$$

A and B are therefore regarded as being composed uniformly.

Let's here assume that the first field and the following second field for digitized video signals as input video signals are represented as shown in FIG. 1(a) and FIG. 1(b), respectively. In this case, the reference character A is represented as shown in FIG. 1(b), whereas the reference character B corresponds to interpolation-processed signals (which have data shown in FIG. 2) in the first field prior to 1 field. Data to be sub-sampled as the second field are as shown in FIG. 3 in which the data indicated by ◯ (circle) are to be sub-sampled.

Paying attention to the third line (third horizontal scanning), data having different lines represented by $A_n$ remain as a result of the sampling. As a consequence, false data are circulated, so that a satisfactory noise-reducing effect cannot be obtained.

SUMMARY OF THE INVENTION

It is an object of the invention to provide a cyclic noise-reducing apparatus which prevents false data from being circulated and can obtain a satisfactory noise-reducing effect.

According to one aspect of the invention, there is provided a cyclic noise-reducing apparatus comprising:

analog/digital converting means for outputting therefrom a digitized video signal corresponding to data indicative of a sampled value obtained by performing sampling of an input video signal;

mixing means for mixing the digitized video signal and a processing signal to be mixed in a mixture ratio depending on the difference in level between the digitized video signal and the mixed processing signal;

sub-sampling means for thinning out data sequentially issued from the mixing means at intervals of prescribed numbers to output the same;

memory means;

memory controlling means for sequentially writing outputs from the sub-sampling means into the memory means and sequentially reading out the data stored in the memory means therefrom at a timing delayed by a period of N times (N is natural number) the period corresponding to 1 field; and interpolation means for outputting, as the mixed processing signal, a signal depending on data obtained by interpolating a failure of data to be read from the memory means;

the sub-sampling means including means for extracting a vertical synchronizing signal from the input video signal to generate a reset signal for each field in accordance with the vertical synchronizing signal and means for making a start in the sub-sampling operation from the initial state in accordance with the reset signal.

According to another aspect of the invention, there is provided a cyclic noise-reducing apparatus comprising:

analog/digital converting means for outputting therefrom a digitized video signal composed of data indicative of a sampled value obtained by performing sampling of an input video signal;

sub-sampling means for thinning out data indicative of the digitized video signal sequentially outputted from the analog/digital converting means at intervals of prescribed numbers to output the same;

mixing means for mixing the digitized video signal from the sub-sampling means and a processing signal to be mixed in a mixture ratio depending on the difference in level between the digitized video signal and the mixed processing signal;

memory means;

memory controlling means for sequentially writing outputs from the mixing means into the memory means and sequentially reading out the data stored in the memory means therefrom at a timing delayed by a period of N times (N is natural number) the period corresponding to 1 field so as to output the same as the mixed processing signal; and interpolation means for outputting, as a noise-reducing output signal, a signal depending on data obtained by interpolating a failure of data to be outputted from the mixing means;

the sub-sampling means including means for extracting a vertical synchronizing signal from the input video signal to generate a reset signal for each field in accordance with the vertical synchronizing signal and means for making a start in the sub-sampling operation from the initial state in accordance with the reset signal.

In the cyclic noise-reducing apparatus according to the present invention, the reset signal is produced for each field so as to start the sub-sampling operation from the initial state. Therefore, under this sub-sampling operation, the data at the same positions are sampled respectively in the odd and even fields. False data having different lines are therefore prevented from being circulated even when the data referred to above are mixed together and the data including data prior to 1 field are subjected to the interpolation, and hence a satisfactory noise-reducing effect can be obtained.

The above and other objects, features and advantages of the present invention will become apparent from the following description and the appended claims, taken in conjunction with the accompanying drawings in which preferred embodiment of the present invention are shown by way of illustrative example.

BRIEF DESCRIPTION OF THE DRAWINGS

FIGS. 1 through 3 are diagrams each of which shows a state of data for describing an operation of a conventional noise-reducing apparatus;

FIG. 8, and FIGS. 10 through 15 are diagrams each of which depicts a state of data for describing an operation of the noise-reducing apparatus according to the invention;

FIG. 16 is a block diagram showing another embodiment of the present invention.

DETAILED DESCRIPTION OF THE PREFERRED EMBODIMENT

Figure 4:
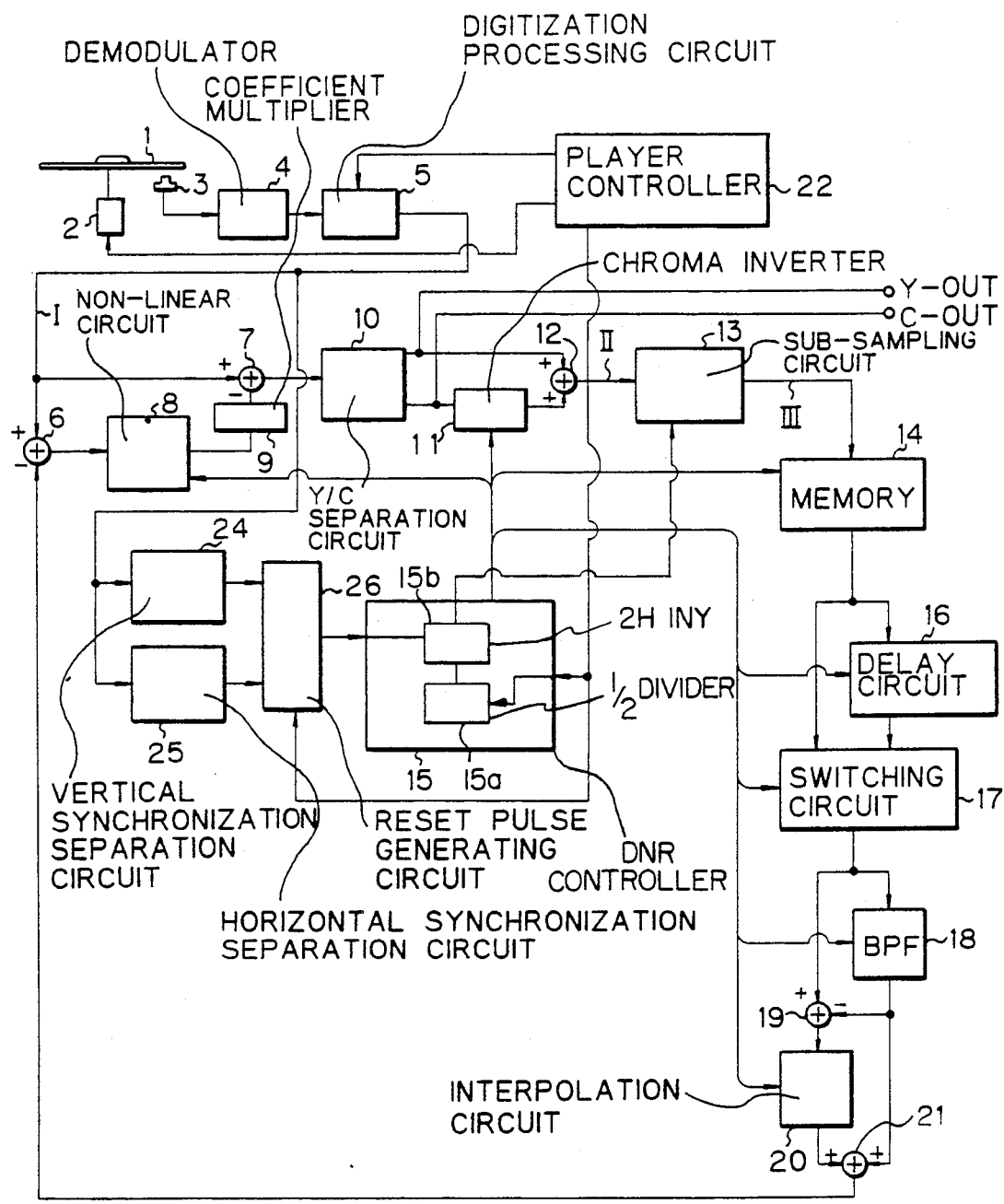
FIG. 4 is a block diagram showing a disc player to which a noise-reducing apparatus according to the invention is applied.

Referring to FIG. 4, a video disc 1 is rotatably driven by a spindle motor 2 and a servo loop (not shown). Information recorded on the disc 1 is read out by a optical pickup 3. The pickup 3 has a laser diode, an actuator for causing a beam of light to converge on a recording face of the disc 1, an actuator for controlling positions defined in a radial direction on which light beams converge, and the like. There is provided servo loops used to drive and control various types of actuators which constitute the pickup 3. These servo loops are not required in particular for illustration and they will therefore be omitted in the present drawing.

An RF signal read by the pickup 3 is applied to a demodulator 4 to be demodulated into a composite video signal (hereinafter called merely "video signal"). The resultant video signal is A/D converted by a digitization processing circuit 5 and subjected to a time base correction. The spindle motor 2, the digitization processing circuit 5 and the servo loops are controlled by a player controller 22. Subtracters 6, 7 are connected to the output of the digitization processing circuit 5. The subtracter 6 performs subtraction between a digital video signal issued from the digitization processing circuit 5 and a digital video signal prior to 1 field, which is issued from an adder 21 to be described later. A non-linear circuit 8 is connected to the output of the subtracter 6. The non-linear circuit 8 comprises a ROM for example, and has an input/output characteristic shown in FIG. 5. A coefficient multiplier 9 is connected to the non-linear circuit 8. The coefficient multiplier 9 multiplies an output value from the non-linear circuit 8 by a coefficient k ($0 \leq k \leq 1$). The output of the coefficient multiplier 9 is connected to the above subtracter 7. The subtracter 7 subtracts the digital video signal issued from the digitization processing circuit 5 from a digital video signal issued from the coefficient multiplier 9. A Y/C separation circuit 10 is connected to the output of the subtracter 7. The Y/C separation circuit 10 digitally separates a video signal supplied from the subtracter 7 into a luminance signal and a color signal. These separated outputs are applied to player output terminals Y-OUT and C-OUT respectively. The color signal is supplied to a chroma inverter 11. The chroma inverter 11 inverts the color signal for each field. The luminance signal is applied to an adder 12 to be added to the output signal from the chroma inverter 11. A sub-sampling circuit 13 is connected to the output of the adder 12. The sub-sampling circuit 13, which will specifically be described later, is activated to thin out signals from the adder 12 at one-signal intervals to be issued therefrom. A memory 14 is connected to the output of the sub-sampling circuit 13. The memory 14 has a storage capacity capable of storing therein a video signal corresponding to 1 field as data, and each of video signals issued from the sub-sampling circuit 13 is sequentially written therein. The written video signal is read out at a timing delayed by a period corresponding to a substantially 1 field from the time when each of the video signals is written in the memory 14. The writing of the video signal in the memory 14 and reading of the same therefrom are controlled in accordance with a program processing of a DNR (Digital Noise Reducer) controller 15. However, the construction disclosed in the specification and the drawings attached to Japanese Patent Application No. 239620/1989 filed by the present applicant may be used. The video signal read out from the memory 14 is applied to a delay circuit 16 and then delayed by 2H. A switching circuit 17 is connected to the reading output of the memory 14 and the output of the delay circuit 16. The switching circuit 17 outputs either one of a video signal read out from the memory 14 and a video signal delayed by 2H with the delay circuit 16. A BPF (Band Pass Filter) 18 and a subtracter 19 are connected to the output of the switching circuit 17. The BPF 18 extracts a signal component in a prescribed band about center frequency of 3.58 MHz, which is included in a video signal issued from the switching circuit 17. The subtracter 19 subtracts the component of the signal in the prescribed band as an output signal of the BPF 18 from the video signal issued from the switching circuit 17. An interpolation circuit 20 is connected to the output of the subtracter 19 and carries out the interpolation of a low-frequency component of a video signal issued from the subtracter 19. The output of the interpolation circuit 20 is connected to an adder. The adder 21 adds together a color signal component from the BPF 18 to an output signal from the interpolation circuit 20 and supplies the result of addition to the subtracter 6.

The non-linear circuit 8, the chroma inverter 11, the sub-sampling circuit 13, the delay circuit 16, the switching circuit 17, the BPF 18 and the interpolation circuit 20 as well as the memory 14 are also controlled by the DNR controller 15.

Figure 6:
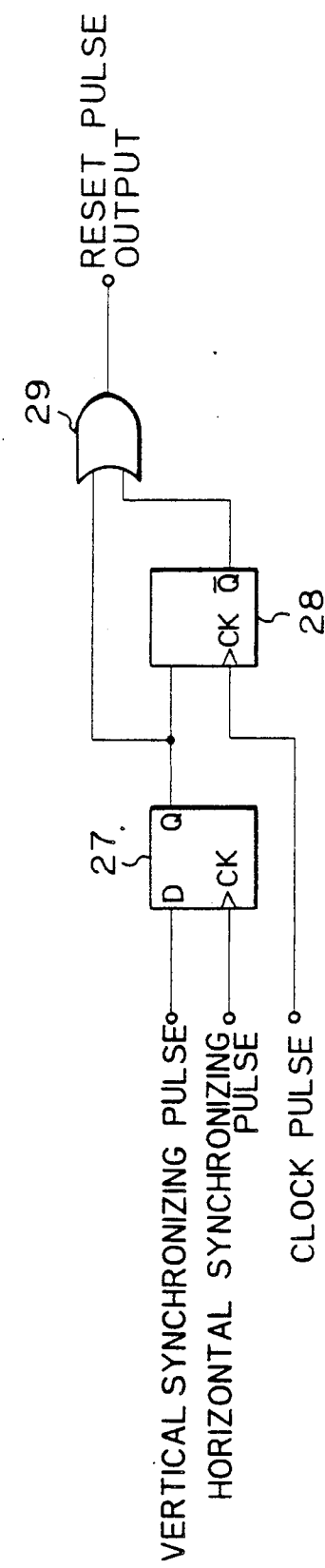
FIG. 6 is a block diagram showing specifically a structure of a reset pulse generating circuit employed in the apparatus shown in FIG. 4.

A vertical synchronization separation circuit 24 and a horizontal synchronization separation circuit 25 are connected to the output of the digitization processing circuit 5. A vertical synchronizing pulse and a horizontal synchronizing pulse issued from the vertical synchronization separation circuit 24 and the horizontal synchronization separation circuit 25 respectively are supplied to a reset pulse generating circuit 26. The reset pulse generating circuit 26 comprises D flip-flops 27, 28 and an OR circuit 29 as shown in FIG. 6. The vertical synchronizing pulse is applied to a data terminal D of the flip-flop 27, and the horizontal synchronizing pulse is applied to a clock terminal CK. An output signal from an output terminal Q of the flip-flop 27 is applied to a data terminal D of the flip-flop 28 and one of the inputs of the OR circuit 29. A clock pulse is supplied to the clock terminal CK from the player controller 22. The frequency of the clock pulse is about 14 MHz which is four times frequency of a color sub-carrier. An output signal from an output terminal $\bar{Q}$ of the flip-flop 28 is supplied to the other of the inputs of the OR circuit 29. A reset pulse is produced from the output of the OR circuit 29.

Figure 7:
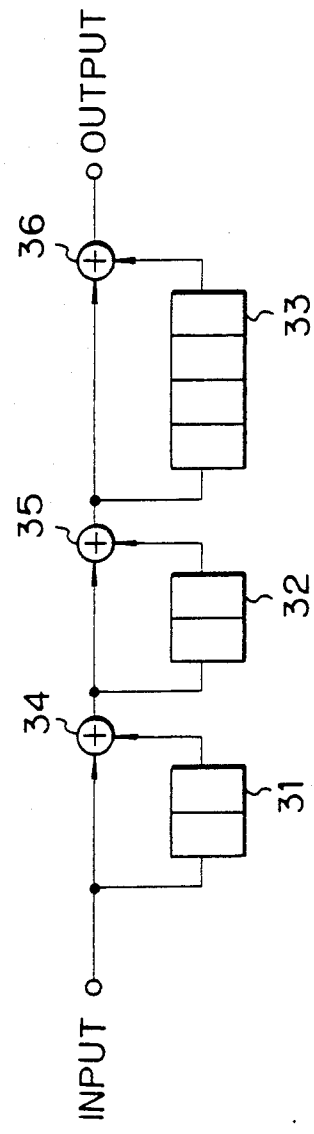
FIG. 7 is a block diagram illustrating specifically a structure of a BPF employed in the apparatus shown in FIG. 4.

Incidentally, as shown in FIG. 7, the BPF 18 is constructed in the form of three stages, i.e., 2 clock delay elements 31, 32 and a 4 clock delay element 33. Namely, in the first stage, an input signal is delayed by 2 clocks by means of the 2 clock delay element 31, and a subtracter 34 subtracts the signal delayed by 2 clocks from the input signal. In the middle stage, an output signal from the subtracter 34 is delayed by 2 clocks by means of the 2 clock delay element 32, and a subtracter 35 subtracts the signal delayed by 2 clocks with the delay element 32 from the output signal of the subtracter 34. In the final stage, an output signal from a subtracter 35 is delayed by 4 clocks by means of the 4 clock delay element 33, and an adder 36 adds together the signal delayed by 4 clocks with the delay element 33 to the output signal of the subtracter 35. Thus, the signal processing is effected between signals which appear at one-clock intervals. Accordingly, the signals adjacent to each other are not mixed together.

Figure 5:
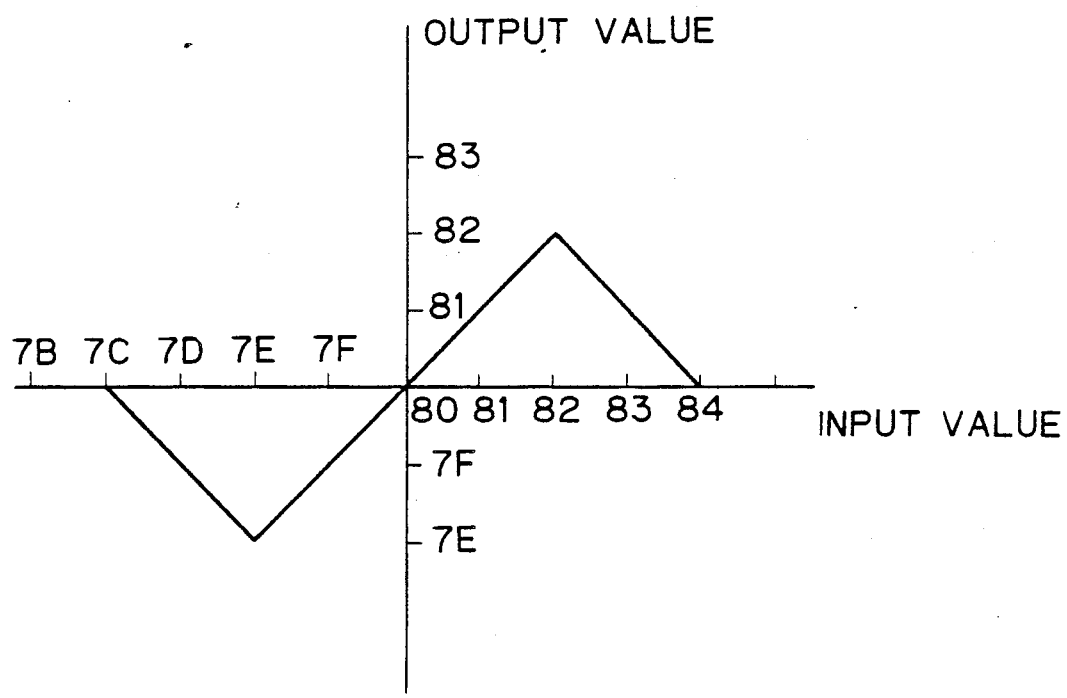
FIG. 5 is a diagram for describing an input/output characteristic of a non-linear circuit employed in the apparatus shown in FIG. 4.

In such an arrangement as referred to above, the video signal recorded on the video disc 1 is read out by the pickup 3 as the RF signal to be demodulated into the video signal by the demodulator 4. The demodulated video signal is A/D converted by the digitization processing circuit 5 into the digital video signal and the digital video signal is subjected to the time-base correction. The time-base corrected digital video signal is supplied to the subtracter 6. The subtracter 6 receives a video signal obtained by applying the interpolation processing to the video signal read from the memory 14. The video signal thus received is equivalent to a signal obtained by delaying the video signal issued from the subtracter 6 by a period of time corresponding to 1 field. The subtracter 6 subtracts the signal delayed by the period corresponding to 1 field from the time-base corrected digital video signal. The output video signal of the subtracter 6 becomes a motion component. The motion component is applied to the non-linear circuit 8. When the value of the digital video signal is represented in the form of a hexadecimal digit in the non-linear circuit 8, the output value becomes 80 when the input value be either equal to or greater than 84 or equal to 7C or below, as shown in FIG. 5. When the input value falls between 7E and 82, the output value varies in proportion thereto and falls into the same. When the input value falls between 7C and 7E and between 82 and 84, the output value falls between 7E and 80 and between 80 and 82. However, the relation between the digital value and the analog value is defined as follows. Namely, 80 represented in the form of a digital value corresponds to 0 represented in the form of an analog value. In addition, 7F corresponds to −1 and 81 corresponds to +1. Thus, when the video signal supplied to the non-linear circuit 8 is low in level, it is issued as it is. When it is high in level, the output value becomes 80 (0). When it is middle in level, the output value varies in accordance with the level of the supplied video signal. As described above, the video signal subjected to the non-linear processing is multiplied by k by means of the coefficient multiplier 9, and thereafter the subtracter 7 subtracts the video signal multiplied by k from the time-base corrected digital video signal as the output signal of the digitization processing circuit 5.

When the time-base corrected signal is represented by A and a signal subjected to weighted mean is represented by B by way of example, the output of the subtracter 7 can be represented as described in the background of the invention by the following expression:

$$A - kf(A - B)$$

When k = 0.75, the output of the subtracter 7 is as follows:

$$A - 0.75f(A - B)$$

Thus, when the input value is low in level, f(A − B) is equal to A − B, so that A − 0.75(A − B) becomes equal to 0.25A + 0.75B. When it is high in level, f(A − B) is 0, so that A − 0.75f(A − B) becomes equal to A. When it is middle in level, the output value becomes a value based on the input/output characteristic of the non-linear circuit 8.

The output signal from the subtracter 7 is separated into the luminance signal and the color signal by the Y/C separation circuit 10, and thereafter they are applied to the output terminal Y-OUT and C-OUT respectively. The color signal is inverted for each field by the chroma inverter 11 and supplied to the adder 12. The luminance signal is delayed by a period of time required to perform the inverse processing of the color signal by means of unillustrated delay means, and thereafter the adder 12 adds together thus-delayed luminance signal to the color signal subjected to the inverse processing. Thus, the video signal in which the color signal component has been inverse-processed is supplied to the sub-sampling circuit 13.

The sub-sampling circuit 13 samples video signal data supplied from the adder 12 in response to a sampling pulse from the DNR controller 15. Namely, a clock signal from the player controller 22 is divided into a frequency of $\frac{1}{2}$ by a $\frac{1}{2}$ divider 15a. The sampling is effected with a frequency of $\frac{1}{2}$ time that of a clock signal for A/D conversion from the digitization processing circuit 5. The sampling pulse is inverted every 2H in 2H inverter 15b. Thus, as shown in FIG. 8 (a), in an odd field, data at positions indicated by ○ (circle) are sampled, whereas data at positions indicated by X are not sampled.

Figures 9A, 9B, 9C, 9D, 9E:
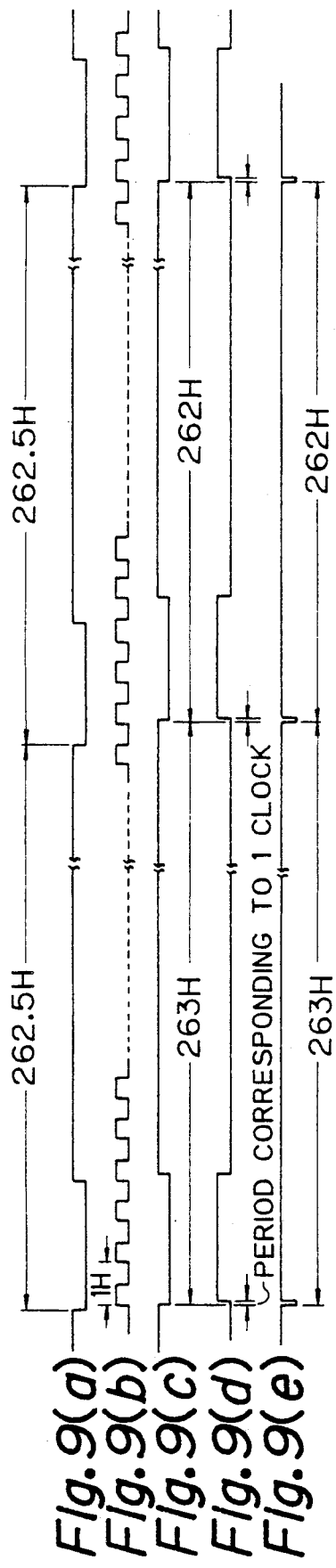
FIG. 9 is a waveform for describing respective operations of the reset pulse generating circuit.

Let's now assume that the vertical synchronizing pulse and the horizontal synchronizing pulse are issued from the vertical synchronization separation circuit 24 and the horizontal synchronization separation circuit 25 respectively as shown in FIGS. 9(a) and 9(b). At this case, the period of the pulse signal issued from the output terminal Q of the D flip-flop 27 is repeated in the form of 263H and 262H. At the rise of the clock pulse, the signal inverted in level with respect to the signal issued from the D flip-flop 27 to the D flip-flop 28 is issued from the output terminal Q of the D flip-flop 28. As shown in FIG. 9(d), this becomes a pulse signal which rises up delayed by 1 clock from the time of a trailing edge of the output pulse signal of the D flip-flop 27. The logical sum of this pulse signal and the output pulse signal of the D flip-flop 27 are taken by the OR circuit 29 so that a reset pulse shown in FIG. 9(e) can be obtained.

Accordingly, the reset pulse is supplied to the DNR controller 15 from the reset pulse generating circuit 26 each time the respective sampling of 263 lines forming the odd field and 262 lines forming an even field is terminated, so as to reset the generation of a sampling pulse in the 2H inverter 15b. As a consequence, even in the even field in the same manner as the odd field, data at the positions indicated by ○ (circle) are sampled, whereas data at the positions indicated by X are not sampled, as shown in FIG. 8(b). Since the data at the positions indicated by X are not sampled, data just before the present data is maintained in each of areas at the positions indicated by X.

Let's now assume that the odd field of the video signal I issued from the digitization processing circuit 5 is represented as data shown in FIG. 10(a) and the even field thereof is represented as data depicted in FIG. 10(b). For the simplicity of illustration, the video signal I will be equal to the video signal II issued from the adder 12. When the odd field of the video signal II is sampled by the sub-sampling circuit 13, the result of sampling is as shown in FIG. 11. Incidentally, $B_{910}$ and $C_{910}$ represent first data of the third and fourth lines obtained from the result that the final data of the second and third lines has been maintained. Thus, it is judged that the data indicated by ○ (circle) are true, whereas it is judged that data other than the data indicated by ○ (circle) are false as data to be arranged at those positions. The sub-sampled video signal III is written into the memory 14 and read out therefrom delayed by a substantially 1 field. The read video signal is applied to one of the input terminals of the switching circuit 17 and delayed by 2H in the delay circuit 16, and thereafter applied to the other of the input terminals of the switching circuit 17. The switching circuit 17 outputs the data indicated by ○ (circle) therefrom delayed at the one of the input terminals as it is. When the data other than the data indicated by ○ (circle) are applied to the one of the input terminals, the switching circuit 17 outputs, in relays, data prior to 2H applied to the other of the input terminals from the delay circuit 16. As a consequence, the data indicated by X are replaced with the data indicated by ○ (circle) prior to 2H, as indicated by the arrow in FIG. 12. The data replacement is effected with respect to the result of sampling shown in FIG. 11 as illustrated in FIG. 13. Incidentally, each of the reference characters $a_2$, $a_4$, $b_2$ and $b_4$ represents data in a previous field.

The video signal issued from the switching circuit 17 is supplied to the BPF 18, where the signal component in the prescribed band about 3.58 MHz thereof is extracted. The subtracter 19 subtracts the signal extracted by the BPF 18 from the video signal issued from the switching circuit 17 so as to obtain a video signal except the signal component in the prescribed band about 3.58 MHz. The component of the video signal in the prescribed band, which is issued from the BPF 18, alternately includes a present signal and a signal prior to only 2H. This is because signals failed to take out by the sub-sampling are interpolated with the signal prior to 2H. However, when the low-frequency component is subjected to interpolation with the signal prior to 2H, a straight line in the horizontal direction is brought into a jagged form. There is often a case where the interpolation may be performed between signals in the horizontal direction. Therefore, the video signal other than the component of the signal in the prescribed band is subjected to interpolation in the interpolation circuit 20 as follows. The interpolating circuit 20 makes up for a failure of the signals to be taken out by the sub-sampling, using the average of signals before and after 1 clock. Namely, the data subjected to the interpolation with data prior to 2H is converted into data obtained by adding together data of $\frac{1}{2}$ time the data prior to 1 clock from the interpolated data and data of $\frac{1}{2}$ time the data after 1 clock from the interpolated data.

As described above, the interpolated signal component in the prescribed band and the video signal other than this component are added together in the adder 21 to be applied to the subtracter 6. The video signal applied to the subtracter 6 from the adder 21 is represented in a signal form shown in FIG. 13. Therefore, this video signal is mixed with the data in the even field as shown in FIG. 10(b). Thus, the video signal II at that time will be as shown in FIG. 14 by way of example. When the video signal II in the even field is sub-sampled by the sub-sampling circuit 13, the result of sampling is as shown in FIG. 15 because the sub-sampling is made in accordance with the sub-sampling pulse reset field by field. Thus, the interpolation is made by data having the same line. For example, in the third line, data $C_1$, $+A_1$, $C_3$, $+A_3$, $C_5$, $+A_5$, ... in which data having different lines such as $A_1$, $A_3$, $A_5$, ... are present as a mixture are eliminated.

In the above-described embodiment, the point or position to be sub-sampled is changed for each 2H. However, this is not necessarily limited to 2H because the position of the sub-sampling is changed for each 2H in order to perform 2H interpolation. Where the video signal is Y/C separated and thereafter Y and C are separately processed by way of example, without effecting the above processing by using the composite video signal as in the above-described embodiment, the scanning period may be other than 2H.

In addition, a description has been made of the cyclic noise-reducing apparatus employing the field memory in the above-described embodiment. However, where the frame memory is used as an alternative, it is only necessary to have the points or positions of the sub-sampling between the frames meet in alignment. It is not always necessary to have the positions of the sub-sampling for each field meet in alignment.

FIG. 16 shows a cyclic noise-reducing apparatus according to another embodiment of this invention. In this apparatus, a digital video signal issued from a digitization processing circuit (not shown) similar to the digitization processing circuit 5 shown in FIG. 4 is supplied to a sub-sampling circuit 41. The sub-sampling circuit 41 serves to thin out the digital video signal for each data in a manner similar to the processing effected in the sub-sampling circuit 13 to output the same therefrom. The output signal from the sub-sampling circuit 41 is applied to a mixing means comprising subtracters 42, 43, a non-linear circuit 44 and a coefficient multiplier 45. The mixing means has the same structure as that comprising the subtracters 6, 7, the non-linear circuit 8 and the coefficient multiplier 9. Namely, this is used to subject the sub-sampled video signal to the noise-reducing processing. A memory 46 and a restoring circuit 47 are connected to the output of the subtracter 43 as the output of the mixing means. The memory 46 has a storage capacity capable of storing therein the video signal corresponding to 1 field as data. Each of the video signals issued from the subtracter 43 is sequentially written into the memory 46 and read out therefrom at a timing delayed by a substantially 1 field. The read video signal is applied to the subtracter 6 as a processing signal to be mixed. On the other hand, the restoring circuit 47 functions as an interpolation means and is constructed in the same manner as the arrangement comprising the delay circuit 16, the switching circuit 17, the BPF 18, the subtracter 19, the interpolation circuit 20 and the adder 21 employed in the apparatus shown in FIG. 4. The signal issued from the restoring circuit 47 becomes a video signal subjected to the noise-reducing processing.

These circuits are controlled by a DNR controller 48 including a ½ divider 48a and 2H inverter 48b in the same manner as the apparatus shown in FIG. 4. In addition, a vertical synchronization separation circuit 49 and a horizontal synchronization separation circuit 50 are connected to the output of the digitization processing circuit. A vertical synchronizing pulse and a horizontal synchronizing pulse issued from the vertical synchronization separation circuit 49 and the horizontal synchronization separation circuit 50 respectively are supplied to a reset pulse generating circuit 51. The reset pulse generating circuit 51 is constructed as shown in FIG. 3 in the same manner as the above reset pulse generating circuit 26. A reset pulse is supplied to the DNR controller 48 from the reset pulse generating circuit 51 each time the respective sampling of 263 lines forming an odd field and 262 lines forming an even field is completed, so as to reset the generation of a sampling pulse. Thus, the sampling is effected from the first data in the odd and even fields as shown in FIGS. 8(a) and 8(b), so that the data at the same positions are sampled. Such processing permits prevention of data having different lines from being mixed in the same field.

According to the cyclic noise-reducing apparatus of the invention, as has been described above, the digitized video signal as the input video signal and the processing signal to be mixed are sequentially mixed in a mixture ratio depending on the difference in level therebetween, and the sampling for thinning out the mixed data at intervals of predetermined numbers to output the same is performed. Then, the sampled outputs are sequentially written into the memory and read out therefrom at a timing delayed by a period of N times the period corresponding to 1 field. A signal depending on data obtained by interpolating a failure of data failed to be read from the memory is issued as the above mixed processing signal. Upon sub-sampling, the vertical synchronizing signal is extracted from the input video signal. The reset signal is then produced for each field in accordance with the vertical synchronizing signal to thereby start the sub-sampling operation from the initial state. Thus, according to this sub-sampling operation, the data at the same positions are sampled respectively in the odd and even fields. False data having different lines are prevented from being circulated even when the data referred to above are mixed together and the data including data prior to 1 field are subjected to the interpolation, so that a satisfactory noise-reducing effect can be obtained.

According to the present invention, the sub-sampling for thinning out the digitized video signals as the input video signals at intervals of prescribed numbers to output the same is carried out, and the sub-sampled output and the processing signal to be mixed are sequentially mixed together in a mixture ratio depending on the difference in level therebetween. The mixed data is then used as the output subsequent to the noise-reducing processing and written into the memory. The data stored in the memory is sequentially read out at the timing delayed by the period of N times the period corresponding to a substantially 1 field, and the video signal corresponding to the data read out from the memory is issued as the processing signal to be mixed. Upon sub-sampling, the vertical synchronizing signal is extracted from the input video signal and the reset signal is produced for each field in accordance with the vertical synchronizing signal so as to start the sub-sampling operation from the initial state. Thus, according to this sub-sampling operation even in the case of the invention, the data at the same positions are sampled respectively in the odd and even fields. False data having different lines are prevented from being circulated even when the data referred to above are mixed together and the data including data prior to 1 field are subjected to the interpolation, and hence a satisfactory noise-reducing effect can be obtained.

Having now fully described the invention, it will be apparent to those skilled in the art that many changes and modifications can be made without departing from the spirit or scope of the invention as set forth herein.

What is claimed is:

1. A cyclic noise-reducing apparatus comprising:
    analog/digital converting means for producing a digitized video signal composed of data blocks each indicative of a sampled value obtained by sampling an input video signal;
    mixing means for mixing said digitized video signal and a processing signal at a mixture ratio depending on a difference in level between said digitized video signal and said processing signal;
    sub-sampling means for thinning out a data block from a mixture signal issued from said mixing means every prescribed number of data blocks;
    a memory;

memory controlling means for sequentially writing outputs from said sub-sampling means into said memory and for sequentially reading out data stored in said memory therefrom at a timing delayed by a period of N times (N is a natural number) a period corresponding to 1 field; and interpolation means for performing interpolation of data blocks read from said memory so as to produce an interpolated signal and supplying said interpolated signal to said mixing means as said processing signal;

said sub-sampling means including reset signal generating means for extracting a vertical synchronizing signal from said digitized video signal to generate a reset signal for each field in accordance with said vertical synchronizing signal and means for starting sub-sampling operation from an initial state in accordance with said reset signal.

2. A cyclic noise-reducing apparatus according to claim 1, wherein said sub-sampling means performs sampling of digital data at a frequency of ½ that of a clock signal for analog/digital conversion fed from said analog/digital converting means.

3. A cyclic noise-reducing apparatus according to claim 1, wherein said reset signal generating means comprises a first D flip-flop having a data terminal supplied with said vertical synchronizing signal and a clock terminal supplied with a horizontal synchronizing signal from said digitized video signal, second D flip-flop having a data terminal supplied with a non-inverted output signal of said first D flip-flop and a clock terminal supplied with a clock signal, and an OR circuit for generating said reset signal by determining a logical sum of said non-inverted output signal of said first D flip-flop and an inverted output signal of said second D flip-flop.

4. A cyclic noise-reducing apparatus comprising:

analog/digital converting means for producing a digitized video signal composed of data blocks each indicative of a sampled value obtained by sampling an input video signal;

sub-sampling means for thinning out a data block from said digitized video signal issued from said analog/digital converting means every prescribed number of data blocks;

mixing means for mixing said digitized video signal from said sub-sampling means and a processing signal to be mixed in a mixture ratio depending on a difference in level between said digitized video signal and said processing signal;

a memory;

memory controlling means for sequentially writing outputs from said mixing means into said memory and sequentially reading out the data stored in said memory therefrom at a timing delayed by a period of N times (N is a natural number) a period corresponding to 1 field so as to output the read data as said processing signal to said mixing means; and interpolation means for performing interpolation of data blocks issued from said mixing means and producing the interpolated signal as a noise-reducing output signal;

said sub-sampling means including reset signal generating means for extracting a vertical synchronizing signal from said digitized video signal to generate a reset signal for each field in accordance with said vertical synchronizing signal and means for starting sub-sampling operation from an initial state in accordance with said reset signal.

* * * * *